US000001887H

United States Statutory Invention Registration [19]

[11] Reg. Number: H1,887

Fuller

[45] Published: Oct. 3, 2000

[54] DRILL GUIDE FOR COMBINATION LOCK MOUNTING AND METHOD FOR USING DRILL GUIDE

[75] Inventor: Jonathan L. Fuller, Newburg, Md.

[73] Assignee: The United States of America as represented by the Secretary of the Navy, Washington, D.C.

[21] Appl. No.: 09/184,636

[22] Filed: Nov. 3, 1998

[51] Int. Cl.[7] ..... B23B 45/14

[52] U.S. Cl. ..... 408/103; 408/115 R

[58] Field of Search ..... 408/72 R, 115 R, 408/115 B; 33/520, 644, 628, 636

[56] References Cited

U.S. PATENT DOCUMENTS

| | | | |
|---|---|---|---|
| 2,792,727 | 5/1957 | McCuen | 77/62 |
| 2,987,944 | 6/1961 | Ammann | 408/72 R |
| 3,048,062 | 8/1962 | Bass | 77/63 |
| 3,302,674 | 2/1967 | Russell et al. | 145/129 |
| 4,248,554 | 2/1981 | Boucher et al. | 408/97 |
| 5,018,912 | 5/1991 | Reitz | 408/106 |
| 5,114,285 | 5/1992 | Brydon | 408/115 R |
| 5,479,802 | 1/1996 | Miller | 70/443 |
| 5,782,006 | 7/1998 | Erway et al. | 408/115 R |

*Primary Examiner*—Harold J. Tudor
*Attorney, Agent, or Firm*—James B. Bechtel, Esq.

[57] ABSTRACT

A drill guide for combination lock mounting and method for fabricating and using the drill guide is provided. The drill guide is fabricated using several interior mounting plates bonded together to form a sufficient thickness to maintain a true level bore hole. The fabrication guide plate is attached to a secure door using a threaded clamping device extending through a lock spindle hole. Thereafter, the smaller interior holes are drilled completely through the door. Larger exterior holes are then drilled partway through the door from the outside. The door is then ready to accept an exterior combination lock plate having female studs extending into the door.

6 Claims, 5 Drawing Sheets

A statutory invention registration is not a patent. It has the defensive attributes of a patent but does not have the enforceable attributes of a patent. No article or advertisement or the like may use the term patent, or any term suggestive of a patent, when referring to a statutory invention registration. For more specific information on the rights associated with a statutory invention registration see 35 U.S.C. 157.

DRILL GUIDE FOR COMBINATION LOCK MOUNTING AND METHOD FOR USING DRILL GUIDE

ORIGIN OF THE INVENTION

The invention described herein was made in the performance of official duties by an employee of the Department of the Navy and may be manufactured, used, licensed by or for the Government for any governmental purpose without payment of any royalties thereon.

FIELD OF THE INVENTION

The invention described herein relates to cutting tools and in particular to jigs and guides for drilling.

BACKGROUND OF THE INVENTION

The use of various guides including jigs and templates for the drilling of holes is well known in the art. A particularly challenging use of these guides is in the attachment of drill-proof exterior plates used on safes and combination locks. These locks are mounted on a door from the inside with solid drill resistant plates on the outside. Often the solid exterior plate has female studs which extend only partway through the door. These configurations require the accurate location and true leveling of all installation holes and typically require drilling from both the interior of the door and the exterior of the door. An example is a door requiring larger stud holes drilled from the exterior side of the door with smaller concentric holes (for attachment screws) drilled from the interior side of the door. All of these holes must be precisely located, precisely level, and for interior-exterior concentric holes, precisely centered. These requirements make the use of a simple template difficult as the template must be leveled by some outside means in order to produce a true level bore hole. Where different diameter holes, concentric and intersecting, must be drilled from opposite sides of a door, even complex jigs frequently result in out-of-alignment bores. What is needed is a system to provide a small diameter bore hole on one side of a door and a large diameter bore hole on the opposite side of the door, both holes being precisely level and aligned precisely on the same centers.

SUMMARY OF THE INVENTION

Accordingly, it is an object of the invention to provide a drill guide for boring holes for lock mounting plates which accurately locate mounting holes on both sides of a door.

It is another object of the invention to provide a drill guide which accurately levels all mounting holes.

It is yet another object of the invention to provide a drill guide which facilitates the locating of exterior and interior pairs of bore holes so that each pair has common centers of the exterior and interior bore holes.

It is a further object of the invention to provide a drill guide requiring only a single set-up after which all interior and exterior holes may be bored.

The invention is a drill guide fabricated using drill-proof steel having a thickness sufficient to provide a true level alignment of a drill bit. The guide is a rectangular fixture approximately 3"×5" and ¾" thick having a one-half inch clamping hole and a plurality of smaller guide holes. The one-half-inch clamping hole is used with threaded clamps which secure the guide to a door by clamping through the lock spindle hole. A typical installation is accomplished by removing the old lock and accurately positioning the drill guide over the old lock location. Thereafter, the drill guide is attached to the door using the two screws nearest the strike plate. The threaded clamp is then used to completely secure the drill guide. Once the drill is secured in position, small bore holes are drilled from the interior of the door all the way through the door using the drill guide to provide hole location and bore leveling. The task is completed by drilling larger bore holes from the exterior side of the door, these holes centered on the smaller holes drilled from the inside. The larger bore holes extend only partway through the door as necessary to fit the exterior combination plate.

BRIEF DESCRIPTION OF THE DRAWINGS

The foregoing objects and other advantages of the present invention will be more fully understood from the following detailed description and reference to the appended drawings wherein corresponding reference characters indicate corresponding parts throughout the several views of the drawings and wherein.

DETAILED DESCRIPTION OF THE INVENTION

Figure 1:
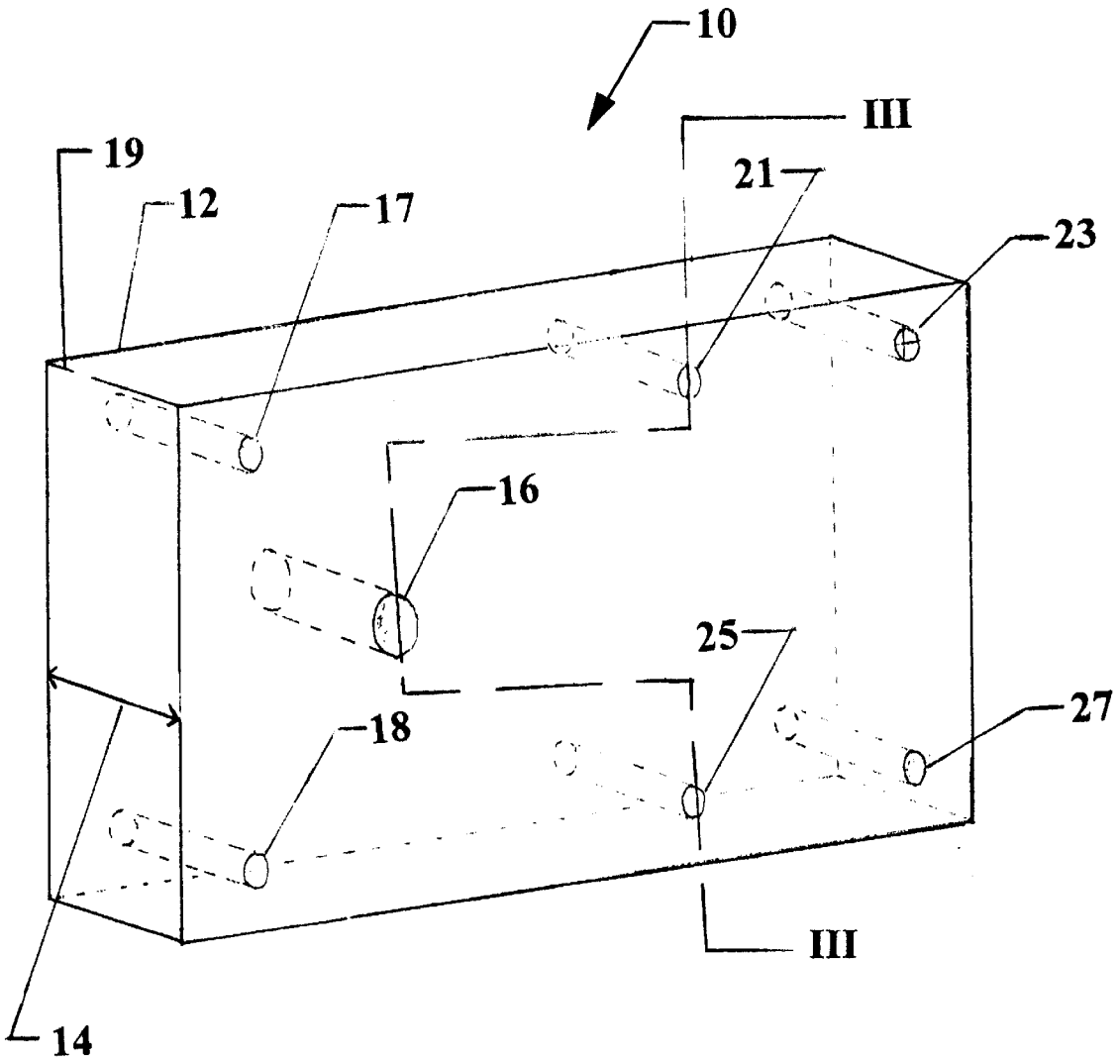
FIG. 1 is a perspective view of the drill guide showing the general dimension and hole locations.

Referring now to FIG. 1, the drill guide of the present invention, designated generally by the reference numeral 10, is shown depicting its major features. The guide plate 12 is approximately 3"×5" and ¾" thick. This thickness 14 is sufficient to provide a true alignment of the interior bore holes which are formed by drilling through guide holes 17, 18 and 21, 23, 25 and 27. The larger hole 16 is aligned with the lock spindle location and is used for clamping the guide plate 12 to a door. The drill guide 10 in the preferred embodiment was fabricated using drill-resistant steel interior plates from several locks. A series of these plates 19 were bonded together to provide sufficient thickness 14 to maintain accurate level alignment of the drill bit. This drill guide 10 may be fabricated using other means providing the thickness is sufficient to maintain drill alignment and the material is resistant to guide hole enlargement by the drill. Section III—III is shown in detail in FIG. 3.

Figure 2:
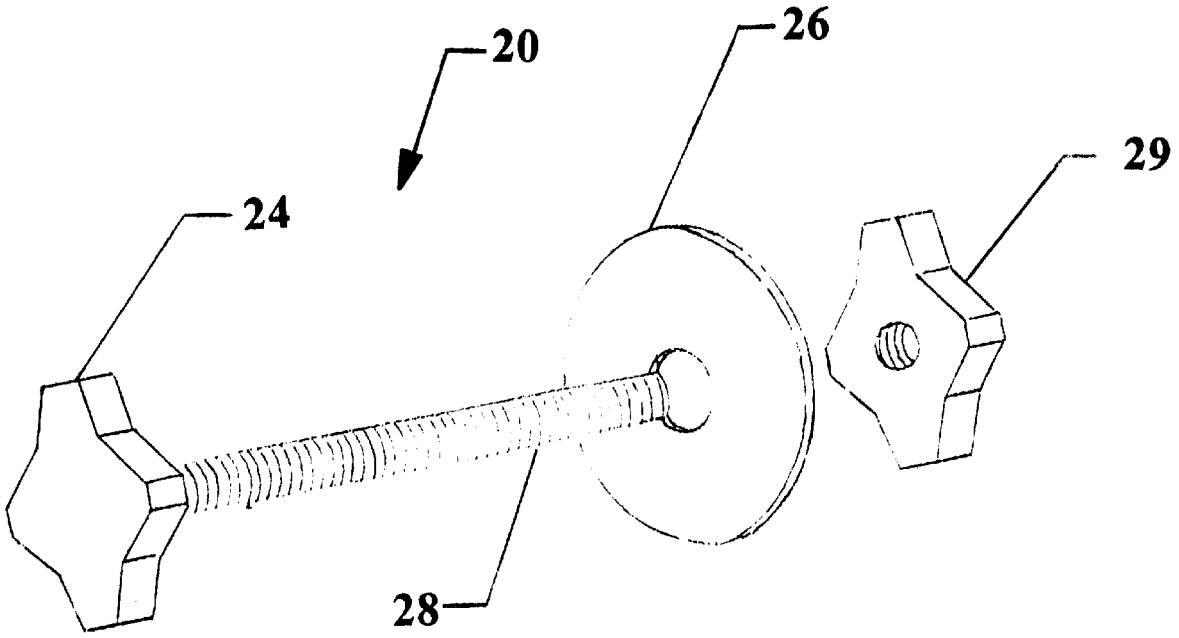
FIG. 2 is a perspective view of the clamping device used to secure the drill guide to a door.

Referring now to FIG. 2, the clamping device 20 is shown with its components. The clamping device 20 has an attached hand-operated knob 24 attached to a one-quarter-inch threaded rod 28. A second threaded hand-operated knob 29 is attached to the other end of the threaded rod 28. At least one washer 26 is required to span the lock spindle opening on the door.

Figure 3:
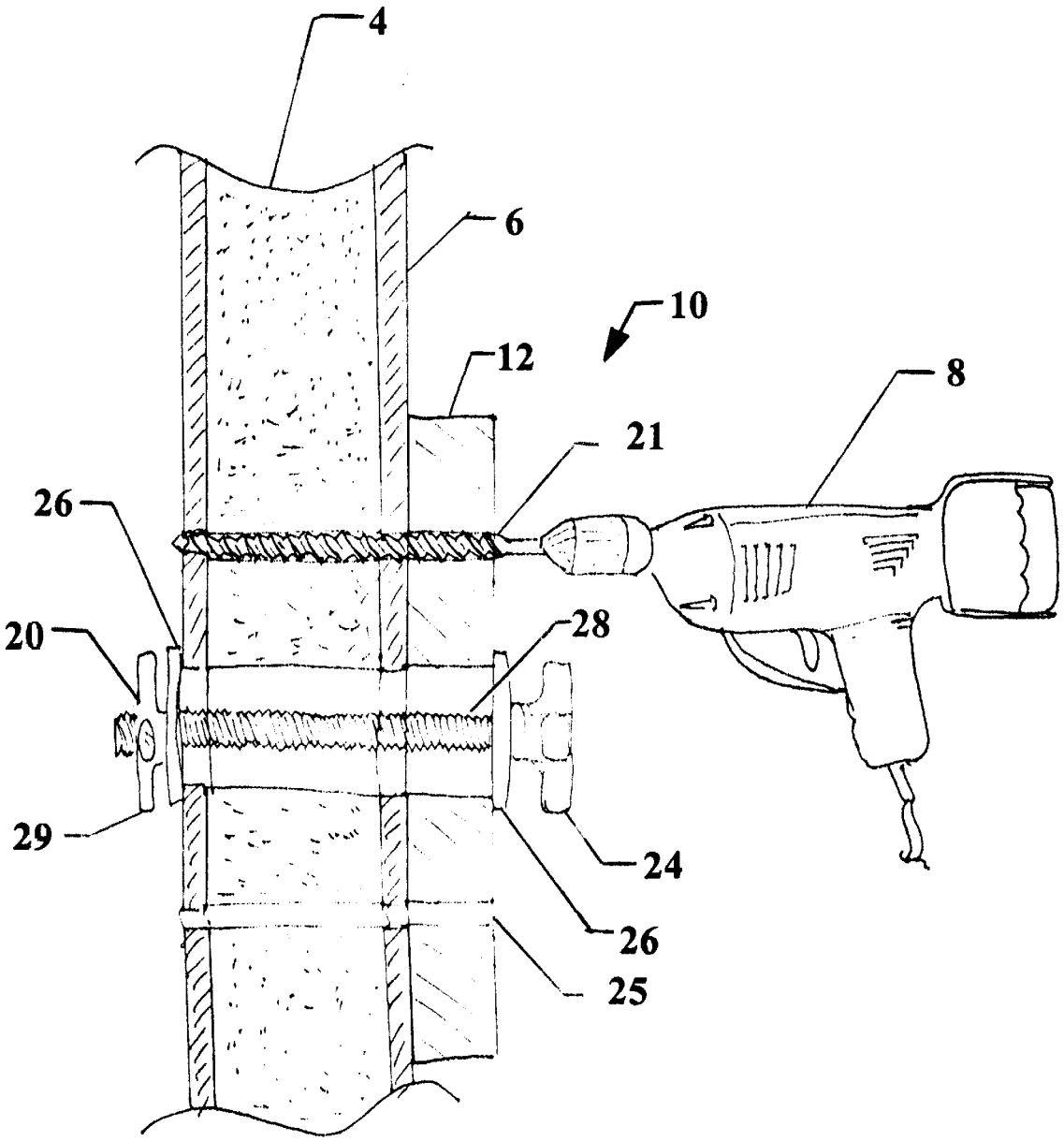
FIG. 3 is a cross-sectional view of a door with the drill guide being used to set the smaller interior holes.

FIG. 3 depicts a cross-section of a typical secure door 4. The door 4 typically has outer steel sheathing 6 which can be drilled. The drill guide 10 is also shown in cross-section, the guide 10 comprising the guide plate 12 and the clamping device 20. The guide plate 12 is secured to the door 4 by the clamping device 20 which, in this instance, is shown with the washers 26 on both sides of the door 4. For reference, the threaded rod 28 is shown with the attached knob 24 and the threaded knob 29. The guide holes 21 and 25 (on the striker plate side of the guide plates) are shown with the bore hole from guide hole 25 drilled completely through the door 4. The bore hole from guide hole 21 depicts the completion of drilling by hand drill 8 using a small drill. In the preferred embodiment, the holes drilled from the interior of the door, that is, the side of the door on which the drill guide 10 is mounted, are drilled using a 7/32" drill bit which is the exact fit for the guide holes in the guide plate 12.

Figure 4:
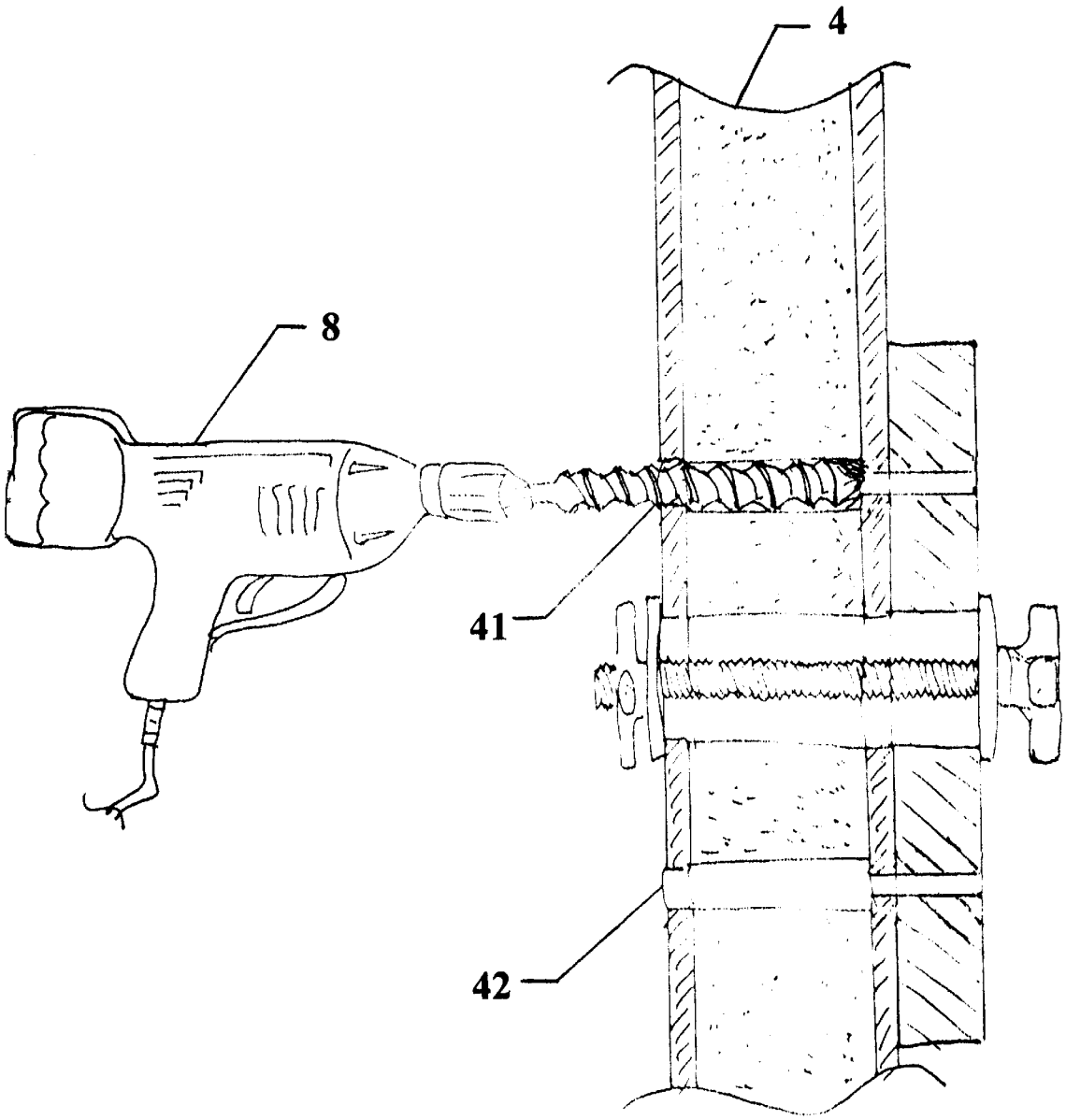
FIG. 4 is a cross-sectional view of a door with the drill guide being used to set the larger exterior holes.

Completion of the door 4 may be seen in FIG. 4. The hand drill 8 is used to bore larger exterior holes 41 and 42. These holes are sunk to a depth less than the thickness of the door 4, but deep enough to accommodate female studs located on an external combination face plate. Bore hole 42 shows a completed hole with a larger diameter exterior side and a smaller diameter interior side. These larger holes 41 and 42 are completed by boring directly into the center of the smaller holes which have been drilled from the inside of the door.

Figure 5:
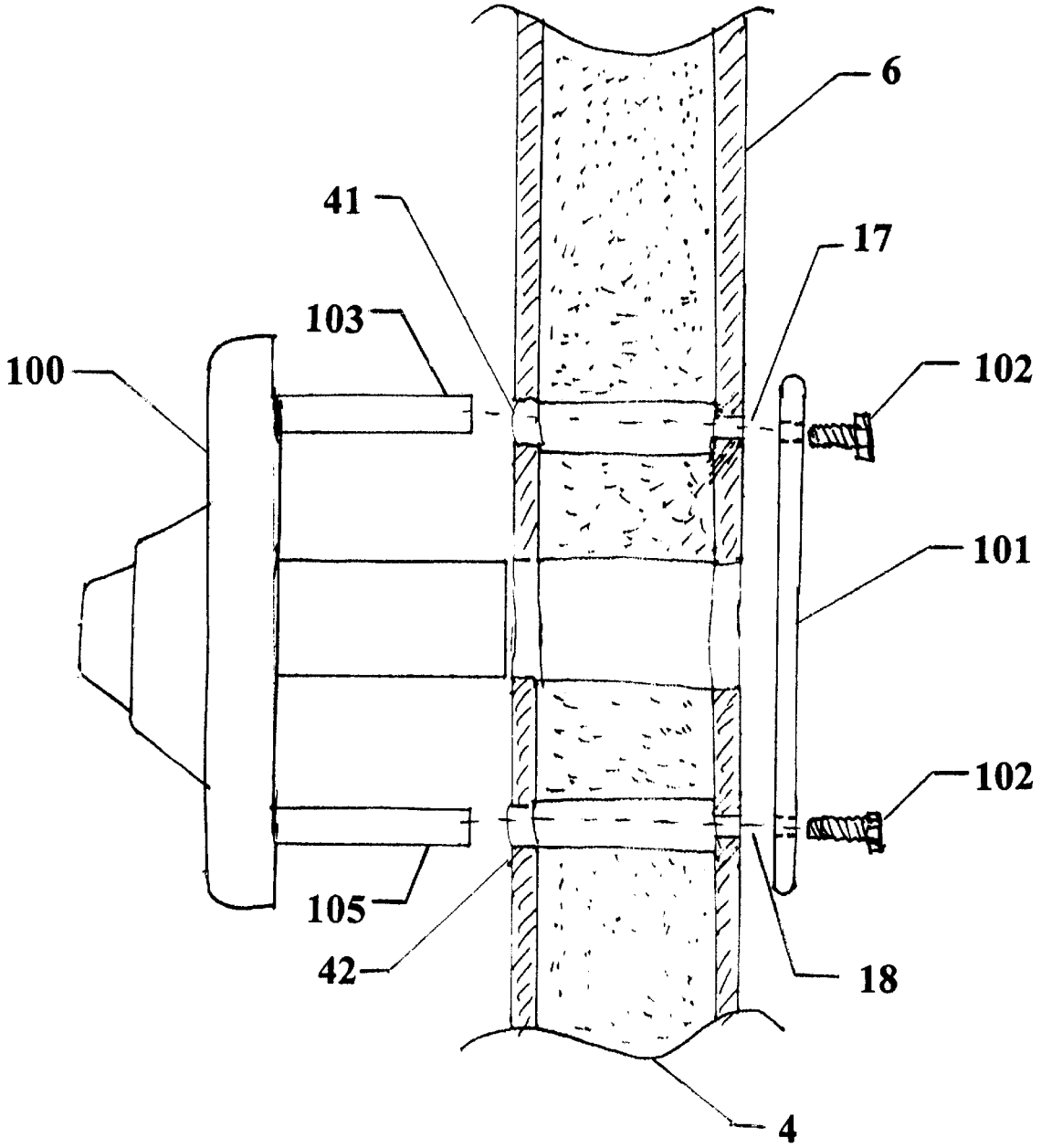
FIG. 5 is a cross-sectional view of a door showing the installation of a typical combination lock.

FIG. 5 shows a cross-section of the completion of the lock installation on door 4. The combination lock and exterior plate 100 slides into the door 4 as shown with the female studs 103 and 105 fitting into large bore holes 41 and 42, respectively. The interior side of the door has a steel sheathing 6 which has only the smaller interior holes 17 and 18. To finish the installation, the interior plate 101 is attached to the interior of the door 4 using fasteners represented here as the bolts 102.

The features and advantages of the invention are numerous. The prior methods require drilling by sight or template and then widening the holes repeatedly until the exterior mounting plate can be inserted and aligned with the interior mounting plate. Using the invention herein, the positioning and alignment of the bore holes is accurate on the first drilling. The larger exterior holes are also concentric and aligned on the first drilling. As a result, the installation job is much quicker and much neater. Very little special equipment is needed. The drill guide plate can be fabricated on site using several interior plates banded together.

Although the invention has been described relative to a specific embodiment thereof, there are numerous variations and modifications that will be readily apparent to those skilled in the art in the light of the above teachings. It is therefore to be understood that, within the scope of the appended claims, the invention may be practiced other than as specifically described.

What is claimed as new and desired to be secured by Letters Patent of the united states is:

1. A drill guide for mounting a combination lock to a door having a lock spindle bore, said drill guide comprising:

a guide plate having a plurality of guide holes and a larger bore hole bored therethrough, said plurality of guide holes being parallel to said larger bore hole and being distributed about said larger bore hole; and a clamping device inserted through said larger bore hole and a lock spindle bore of a door for attaching said guide plate to the door.

2. A drill guide for mounting a combination lock as in claim 1 wherein said drill guide is fabricated using drill-resistant steel plates.

3. A drill guide for mounting a combination lock as in claim 1 wherein said guide plate comprises a plurality of plates bonded together to a thickness such that each of said plurality of guide holes can maintain alignment of a drill bit passing through one of said plurality of guide holes.

4. A drill guide for mounting a combination lock as in claim 1 wherein said clamping device further comprises a threaded rod having a hand-operated knob attached to a first end and a threaded knob attached to a second end, such rod having at least one washer located thereon.

5. A method for using a drill guide for mounting a combination lock to a door having a lock spindle bore, said method comprising the steps of:

fabricating a guide plate having a plurality of guide holes and a larger bore hole bored therethrough, said plurality of guide holes being parallel to said larger bore hole and being distributed about said larger bore hole;

fabricating a clamping device that cooperates with said larger bore hole and the lock spindle bore of a door for attaching said guide plate to the door;

clamping said guide plate to an interior side of a door using said clamping device;

drilling first holes from the interior side of the door completely through the door using said plurality of guide holes;

drilling second holes partway through the door from an exterior side thereof using said first holes as guides, wherein said second holes are larger in diameter than said first holes;

removing said guide plate;

installing an exterior combination lock mounting plate from the exterior side of the door using said second holes and the lock spindle bore; and securing an interior combination lock mounting plate from the interior side of the door to said exterior combination lock mounting plate using fasteners that project into said first holes.

6. A method according to claim 5 wherein said step of fabricating a guide plate comprises the step of bonding together a plurality of drill-resistant plates to form said guide plate having a thickness that maintains alignment of a drill bit passing through one of said plurality of guide holes.

* * * * *